United States Patent [19]

Ireland et al.

[11] Patent Number: 4,665,625
[45] Date of Patent: May 19, 1987

[54] COMPONENT MEASURING APPARATUS WITH MULTIPLE COMPONENT MULTIPLE POSITIONING DEVICE

[75] Inventors: Eric Ireland, Letchworth; Rory M. O'Brien, Hitchin; Barrie Wall, Stotfold; Peter A. R. Hicks, Arlesey; Zbigniew Zaremba, Bedford, all of England

[73] Assignee: Sigma Limited, Letchworth, England

[21] Appl. No.: 802,454

[22] Filed: Nov. 27, 1985

[30] Foreign Application Priority Data

Dec. 1, 1984 [GB] United Kingdom ................. 8430398

[51] Int. Cl.⁴ .............................................. G01B 7/28
[52] U.S. Cl. ........................................ 33/530; 33/503; 33/549; 33/557
[58] Field of Search ................. 33/557, 530, 551, 552, 33/550, 503, 504, 505, 549

[56] References Cited

U.S. PATENT DOCUMENTS

| | | | |
|---|---|---|---|
| 2,748,490 | 6/1956 | Tandler | 33/552 |
| 2,858,615 | 11/1958 | Aller | 33/552 |
| 3,023,506 | 3/1962 | Tandler et al. | 33/552 |
| 3,869,802 | 3/1975 | Pirner | |
| 4,053,989 | 10/1977 | Yamaji et al. | 33/505 |
| 4,221,053 | 9/1980 | Bobel, II et al. | 33/504 |
| 4,520,569 | 6/1985 | Ireland | |

Primary Examiner—William D. Martin, Jr.
Attorney, Agent, or Firm—Stevens, Davis, Miller & Mosher

[57] ABSTRACT

A component inspection apparatus includes a component holder mounted on a compound slide structure. Two arrays of gauging elements are provided on a mutually perpendicularly movable slide. These arrays can be adjusted on the slide and each array includes a plurality of separate gauge elements movable by contact with the work and at least one linear transducer connected to each gauge element. In use, the slides are moved to a plurality of predetermined positions in a sequence. The displacements of the probe elements at each position are noted and compared with displacements obtained when the same sequence of positions is followed while a master componet is in the holder.

18 Claims, 8 Drawing Figures

COMPONENT MEASURING APPARATUS WITH MULTIPLE COMPONENT MULTIPLE POSITIONING DEVICE

This invention relates to component inspection apparatus intended for use, for example, in the automatic inspection of gas turbine engine turbine blades.

Generally speaking two types of inspection apparatus are currently in use in such automatic inspection applications. One type uses a single probe mounted for movement in a number of different directions by means of a suitable slide structure. The probe includes a switch element which is actuated when the probe touches the work piece or an analog probe the output of which is compared with a reference to detect when it is displaced. In an automatic measuring operation, the slides are driven in a predetermined sequence of movements and measurements are taken by noting the positions of the various slides when the probe contacts the workpiece. Such machines are inevitably relatively slow since measurements are made singly and slide movement at the instant of contact must be slow to ensure that the slide can be stopped without damage to the probe.

The other conventional type of inspection apparatus utilises a plurality of independent analog measurement probes, one for each point of the workpiece where a measurement is required. The probes must be specially designed for the workpiece to be measured and a completely different set of probes will be required for each different workpiece design. Thus, when the measuring machine is to be used on a production line on which workpieces of different designs can be produced, the probe structure has to be changed at each change of workpiece and such changeover can be extremely time consuming. The manufacture must stock a set of measuring probes for each workpiece and maintenance of these sets of probes involves considerable time and highly skilled staff.

In its broadest aspect the invention has as an object to provide a component inspection apparatus in which the above mentioned shortcomings of the conventioal machines are substantially overcome.

In accordance with this broadest aspect of the invention there is provided a component inspection apparatus for inspecting a component by repeated and simultaneous contact of a plurality of gauging means with a plurality of points on the surface of the component, said apparatus comprising a component mounting device for receiving a component to be measured; a gauging means support; gauging means mounted on said support and comprising a plurality of probe elements independently movable relative to said support by contact with said component and at least one analog transducer associated with each probe element for providing an output representing displacement of the associated probe element from a rest position; adjustable means mounting said gauging means on said support whereby the rest positions of said probe elements are adjustable; positioning means for displacing the component mounting device and the gauging means support relative to one another in a plurality of different directions; sequence control means controlling said positioning means so as in use to cause the component mounting device and the gauging means support to be sequentially positioned in a series of different predetermined positions relative to one another; means for receiving the outputs of at least some of said transducers at each of said predetermined positions.

With such an apparatus it is possible to set the positions of the probe means by utilising said adjustable means so as to prepare the apparatus for measurement of a specific type of component. Many different specific components can be inspected on the same apparatus without any need for time-consuming setting up procedures. After the positions have been adjusted, the positioning means is used, under the control of the sequence control means, to cause the probe elements to contact a multiplicity of points on the component, a plurality of readings being taken at each position. These readings are compared with readings previously taken using a master component of the same, or basically the same dimensions.

Preferably said plurality of gauging means comprises a group of said probe elements and associated transducers and said adjustable means incorporates means for angularly adjusting the group as a whole relative to said support.

The adjustable means may also comprise means for adjusting the position of at least one of the probe elements in the group independently of the remainder.

With a view to preventing damage to probe elements, transducers, components under inspection etc., the apparatus prefereably includes a plurality of comparators connected respectively to said transducers and each arranged to produce an output signal if the associated transducer output exceeds a predetermined level, indicating that the probe has been moved beyond a normal measuring range, said comparator outputs being connected to said sequence control means and acting so as overridingly to stop operation of said positioning means if any one of said comparators produces said output signal.

The invention also provides a method of inspecting components comprising causing a gauging means support to take up a series of positions relative to the component such that at each position of the support a plurality of probe elements arrange in an adjustably positioned array on the support, are displaced out of respective rest positions by contact between contact tips on the probe elements and different parts of the surface of the component, and comparing the outputs of analog transducers associated with the respective probe elements with previously recorded outputs of the same transducers obtained when the support is caused to take up the same series of positions relative to a master component.

To allow simple and rapid exchange of individual probe elements when required, there is also provided, in accordance with a further aspect of the present invention a gauging device for use in a component inspecting machine, comprising a carrier, a linear analog transducer having a body mounted on a said carrier and a relatively movable part mounted on said body, an elongated probe element supported on said carrier, a first coupling part on one end of the probe element, a second coupling part on the movable part of the transducer, one of said first and second coupling parts being a spherical element and the other being a socket having three mutually inclined faces for contacting the spherical element, said first and second coupling parts being interengaged such that longitudinal displacement of the probe element by contact of a contact tip at its other end is transmitted to the movable part of the transducer, said transducer providing, in use, an electrical output signal related to the position of the movable part thereof, relative to the transducer body.

An example of the invention will now be described with reference to the accompanying drawings, in which.

Figure 1:
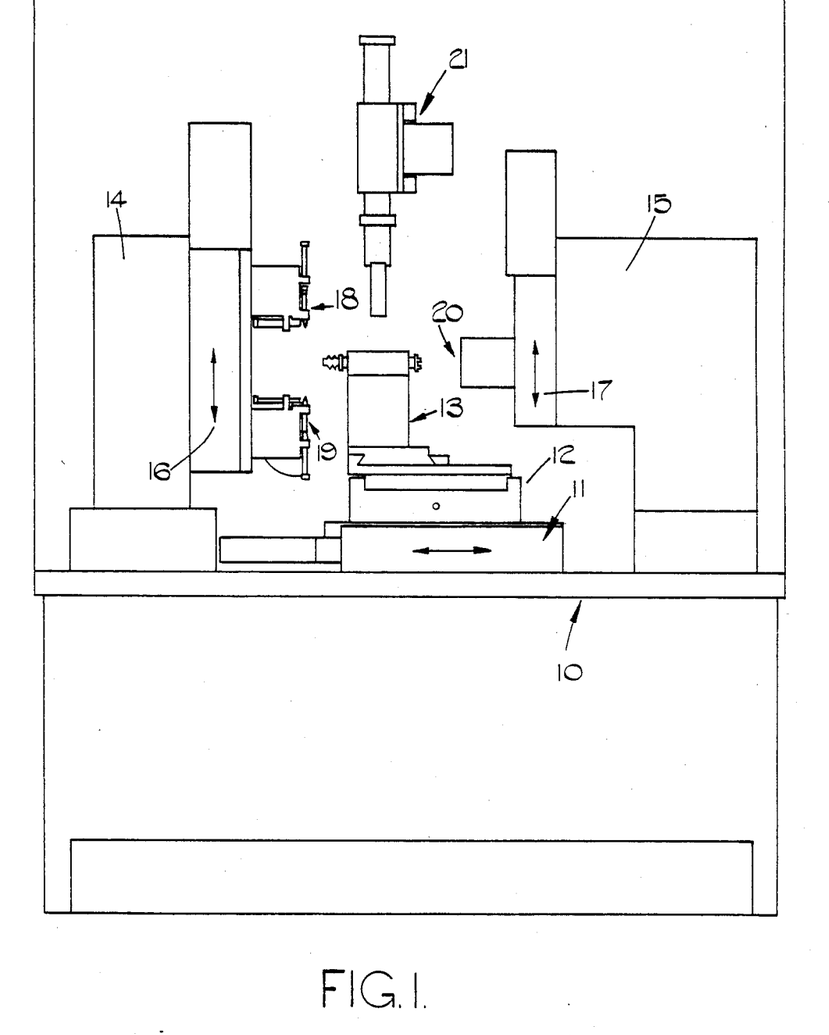
FIG. 1 is a diagrammatic overall view of a component measuring apparatus.
Figure 2:
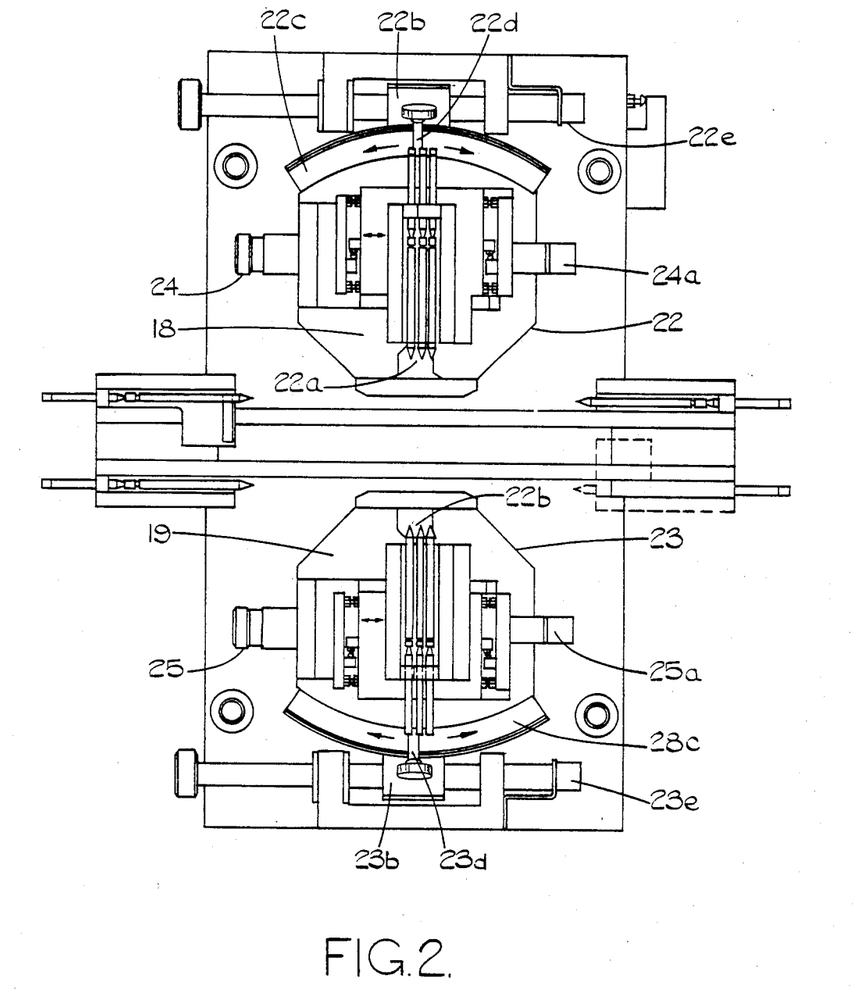
FIG. 2 is an enlarged view looking in the direction of arrow 'A' in FIG. 1 of a probe arrangement forming part of the apparatus.

As shown in FIG. 1 and 2, the apparatus includes a base 10 on which there is provided a workpiece support means incoporating a compound slide structure 11, 12 whereby a workpiece holder 13 is movable in two perpendicular horizontal directions. Also mounted on tha base 10 are two columns 14, 15 on each of which a vertically movable slide, 16, 17 is mounted. The slide 16 has two probe arrays 18, 19 (as well as some further probes) mounted on it, each probe array being mounted on a separate turntable 22, 23 rotatable on an axis 22a, 22b parallel with one of the horizontal directions mentioned above. Each turntable 22, 23 may be manually turned using a manually rotatable rack 22b 22b engaging a gear segment 22c 23c on the turntable 22, 23. A locking device 22d 23d is provided for locking each turntable in its adjusted position in either case. All angular transducer (e.g. a ten-turn potentiometer ) 22e, 23e is provided to provide angular position data to a control computer to be described hereinafter. The slide 17 carries a single probe device 20. Also shown in FIG. 1 is a workpiece handling device 21 which forms no part of the present invention, but is used for loading and unloading the workpiece holder 13.

Each array 18, 19 includes three substantially identical probe/transducer combinations arranged side by side in a spaced parallel relationship with one probe of each array transversely displaceable laterally by a lead screw arrangement 24, 25. Each lead screw has an associated angular transducer 24a, 25a providing positional data to the control computer.

Figures 3, 4, 5:
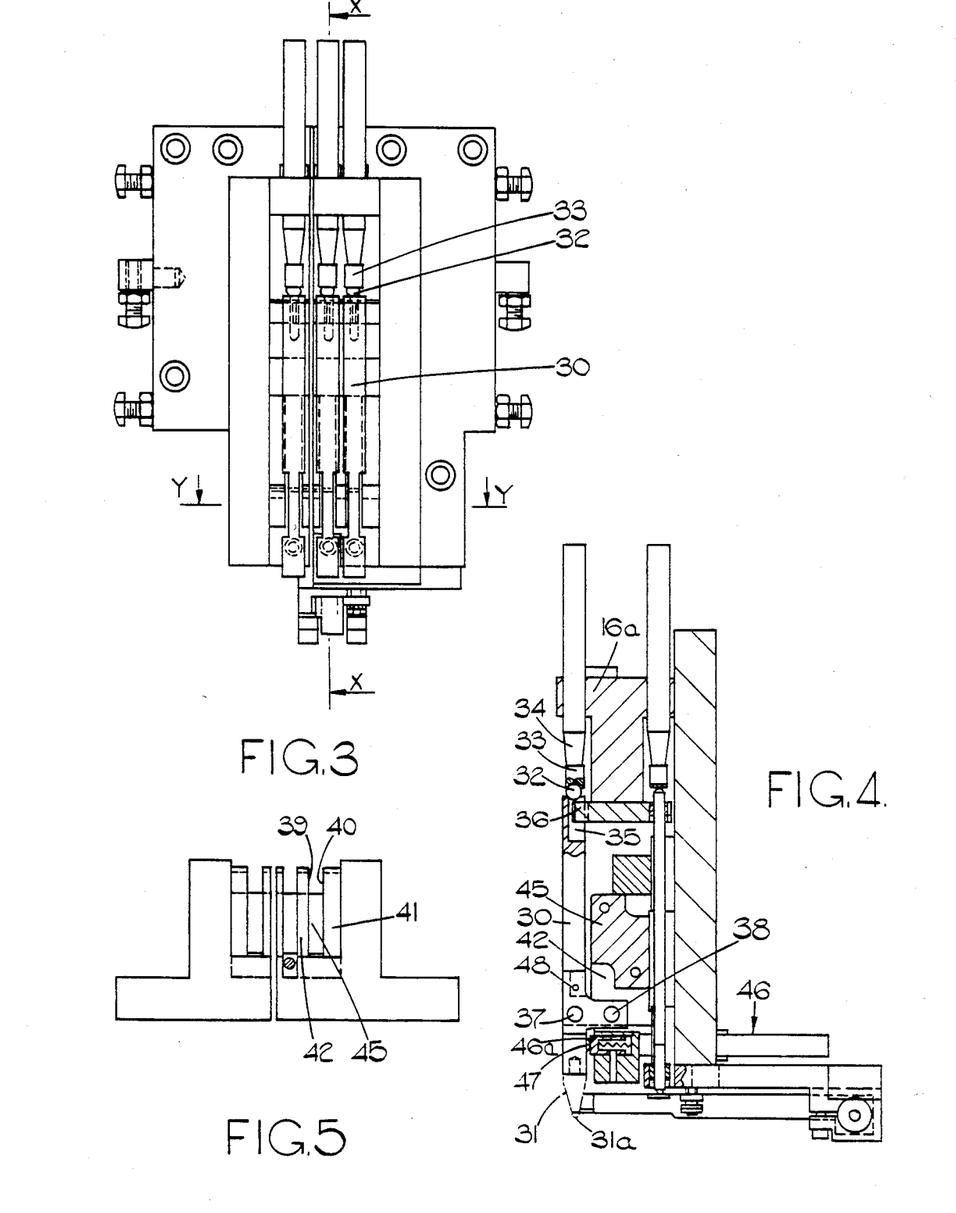
FIG. 3 is an enlarged elevation of an array of probes used in the apparatus.
FIG. 4 is a fragmentary section taken on line Y—Y in FIG. 3.
FIG. 5 is a fragmentary section on line X—X in FIG. 3, but on a smaller scale.

As shown in FIGS. 3 to 5, each such combination includes an elongated probe element 30 which has a contact tip 31 fitted at one end. The contact tip 31 may take various forms according to the tasks it is required to undertake. The contact tip 31 shown in FIG. 4 simply has a tapered projection terminating in a hemispherical surface 31a.

At the opposite end of the probe element 30 a seating is formed into which there is cemented a sphere 32 of rube or other hard material. This sphere co-acts with a socket 33 provided on the free end of the movable stem of an associated first transducer 34. This transducer, which is of the linear differential transformer type, has its body mounted on a suitable bracket 16a. The socket 33 is of known form having three internal flat surfaces inclined to the axis of the transducer at substantially 45° and equiangularly spaced around such axis to provide a stable three point contact with the sphere 32, thereby ensuring that the centre of the sphere 32 lies precisely on the axis of the transducer. The bearings which support the movable member of the transducer on the body thereof ensure that the centre of the sphere can move only along the axis of the transducer.

A slot 35 cut in the end of the probe element 30 receives (with ample clearance) a stop finger 36 on the bracket 16a. An abutment face 36a on this stop finger lies in a plane perpendicular to the transducer axis and is engageable by the sphere 32. The spring loading of the transducer itself causes the socket 33 to urge the sphere 32 against this abutment face so that, in a rest position, the sphere is held in a precise position against this abutment face. Thus far it will be seen that the probe element 30 is effectively universally coupled to the movable member of the transducer 34.

To limit pivotal movement of the probe element 30 relatvie to the movable member of the transducer 34 about the axis of sphere 32, to a single plane, guide means are provided on the probe element 30 and the bracket 16a. The guide means consists of two spheres 37, 38 of diameters larger than the local thickness of the probe element 30 cemented into cross bores in the probe element 30, which spheres lie between opposed planar guide surfaces 39, 40 on a guide plate assembly on the bracket 16. This guide plate assembly comprises guide plates 41, 42, etc. with their planar guide faces parallel to the desired plane of movement of the three probes, spaced apart by discs 45 of thickness only very slightly greater than the diameters of the spheres 37, 38. One of the spheres, i.e. sphere 37, has its centre lying on the axis of the probe element 30 (i.e. the line on which the centres of sphere 32 and hemispherical surface 31a both lie) and the other sphere 38 is spaced from sphere 37 in a direction perpendicular to this axis in the desired plane of movement. This last-mentioned direction is parallel to the axis of a second transducer 46 provided for each probe element.

This second transducer 46 has its body mounted on the bracket 16a and a flat spaced end portion 46a on its movable member. This end portion 46a is urged by the spring loading of transducer 44 into engagement with yet another sphere 47 cemented in a recess in the probe element 30 adjacent the tip 31 (see FIG. 3). The spring loading of the transducer 46 thus urges the probe element 30 to turn in a clockwise direction as viewed in FIG. 3. To limit such clockwise movement the probe element 30 is fitted with a stop pin 48 which projects from both sides of the probe element 30 and can engage a stop face on an extension 42a of the associated plate 42.

It will be noted that the probe element itself is free from all connection to the bracket 16a or the transducers. It can therefore be readily removed by lifting it against the spring-loading of the transducer 34 until the pin 48 is clear of the extension 42a and then simply pulling the probe element to the left as seen in FIG. 4. To mount the same or a replacement probe element the socket 33 is manually lifted, the ball 32 at the end of the probe element is engaged in the socket, the probe element is swung to enter the spheres 37, 38 between the faces 39, 40 until the pin 48 is beyond the extension 42a and then the probe element is lowered until the sphere 32 seats on the stop finger 36.

Figure 6:
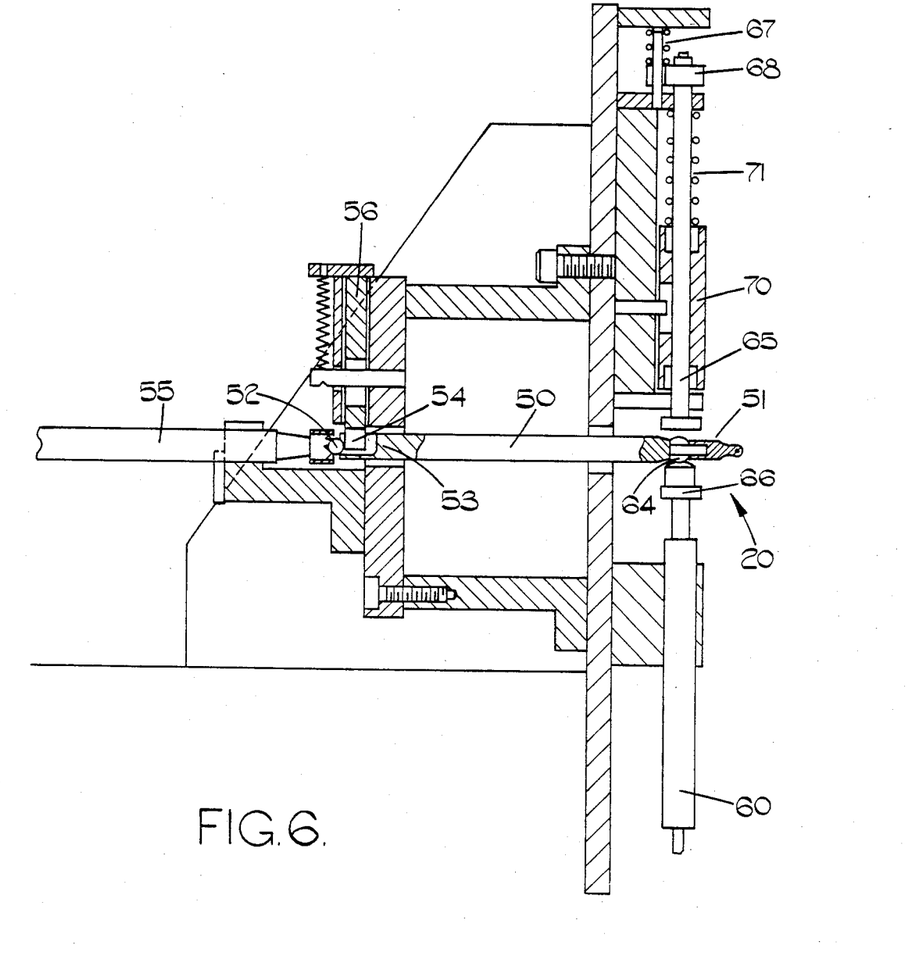
FIG. 6 is a sectional view of another probe used in the apparatus.
Figure 7:
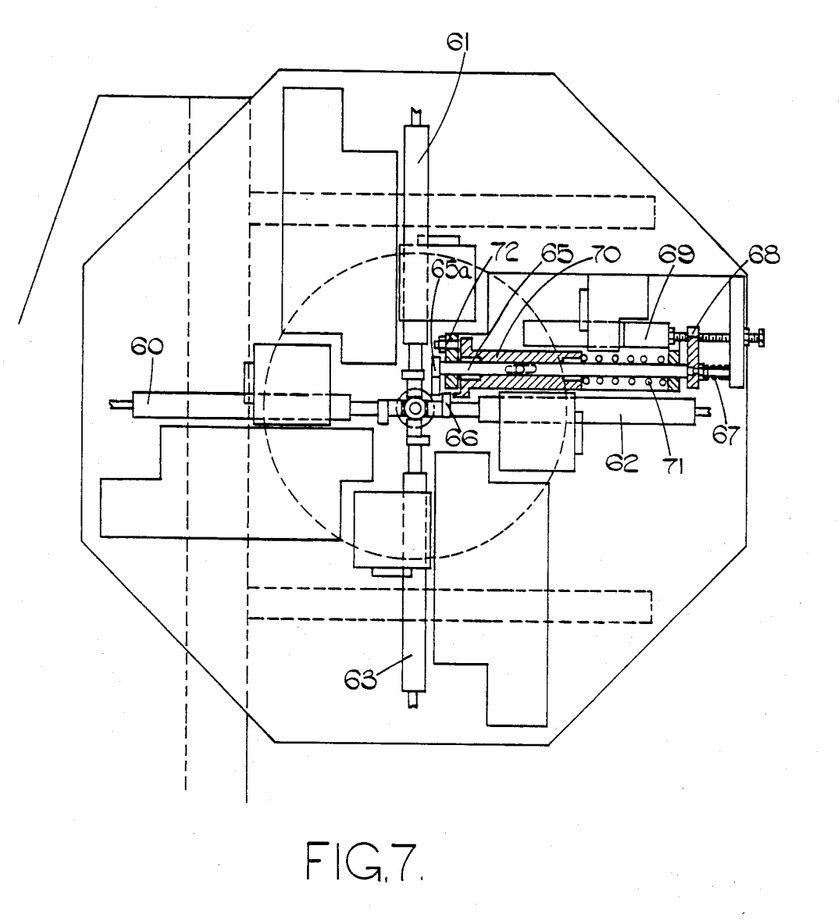
FIG. 7 is an elevation, partly in section of the probe of FIG. 6, on a smaller scale.

The single probe device 30 is shown in more detail in FIGS. 6 and 7. In this case there is an elongated probe element 50 which has a contact tip 51 at one end and a cemented on sphere 52 overlying a lateral slot 53 in the opposite end just like the probe element 30. In this case however, the stop finger 54 against which the sphere 52 is urged by the spring loading of the associated longitudinal displacement transducer 55 is on a manually slidable member 56 which can be displaced to permit removal and replacement of the probe element 50, but which is spring loaded to its active position as shown in FIG. 6.

As shown in FIG. 7 four linear transducer 60, 61, 62 and 63 are provided for measuring transverse displacements of the tip of the probe element 50. These four transducers are arranged in a cruciform configuration, i.e. with transducers 60 and 62 co-axial with one another and transducers 61 and 63 coaxial with one another and perpendicular to the transducers 60 and 62. The axes of the four transducers 60 to 63 lie in a plane perpendicular to the axis of the transducer 55 and intersect on the axis of transducer 55. Each transducer 60 to 63 has a flat face on the end of its movable member which is urged by the spring loading of the associated transducer towards a spherical surface 64 on the probe element adjacent the tip thereof.

Since it would be unsatisfactory to allow the rest position of th probe element to be determined only by the spring loading of the four transducers 60 to 63, an arrangement is provided to hold any selected adjacent pair of the movable members of these transducers in a set position to determine the rest position of the probe element so precisely. This arrangement comprises, for each transducer 60 to 63 a retractor element 65 which has a head 65a at one end which is engageable with a projection 66 on the movable member of the transducer. This retractor element is spring loaded by a spring 67 in the same direction as the spring loading of the associated transducer to a position in which it does not interfere with free movement of the movable member of the transducer. A plate 68 on the other end of the retractor element 65 is acted upon by the piston rod of a pneumatic piston and cylinder unit 69 to displace the retactor element against its spring loading so as to move the projection 66 on the movable member of the transducer into engagement with a stop member 70. This stop member 70 is itself slidable longitudinally of the retractor element 65, but is spring loaded by a spring 71 in the same direction as th spring-loading of the transducer and that of the retractor element 65. An adjustable stop 72 determines the position to which the stop member 70 is urged and the spring 71 is preloaded sufficiently to ensure that the stop member 70 cannot be displaced away from the adjustable stop 72 by the action of the unit 69 alone.

Figure 8:
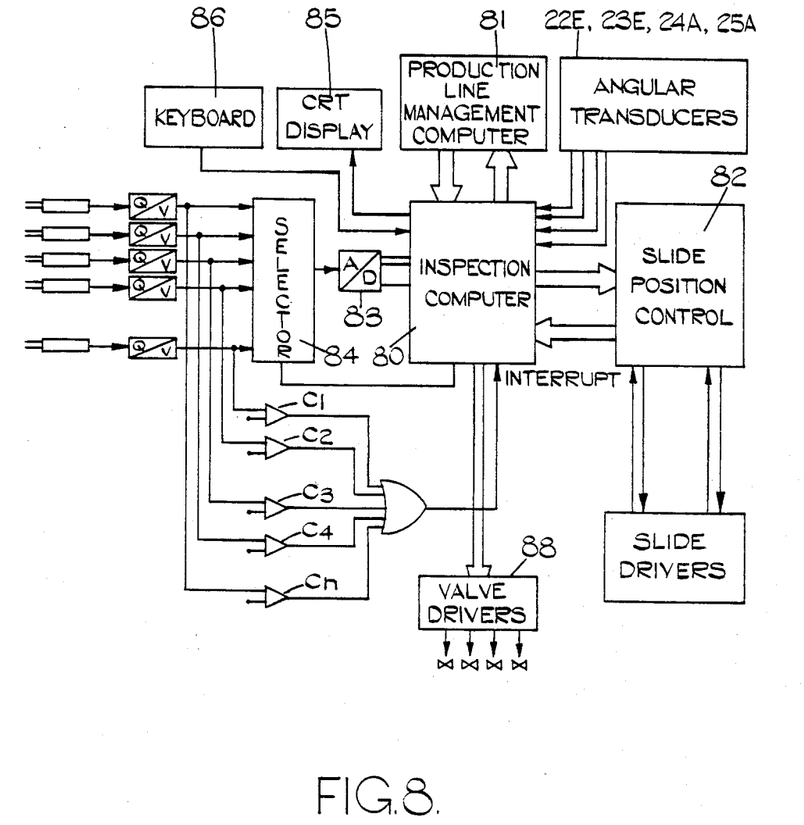
FIG. 8 is a simplified diagrammatic illustration of the operating controls of the apparatus.

Turning finally to FIG. 8, the electrical system of the apparatus includes a computer 80 which includes sufficient storage (e.g. disc drives) for all the program data for all components to be measured. On receipt of component number data from a production line management computer 81, the computer 80 calls up slide movement data from the storage and loads this into a slide position control 82 which is responsible for controlling movement of the various slides. The slide position system makes use of feedback from encoders provided on each slide to ensure that each slide is accurately positioned as required. The resolution of the slide positioning control need not be particularly fine provided that the size of the steps between positions is less than the normal measuring range of each transducer. The accuracy of position must, however, be extremely good, since actual dimensional measurements of the workpiece depend on the accuracy of both the transducers and the slide positioning system. The computer 80 also communicates with the operator of the apparatus via a cathode ray tube display 85 and a keyboard 86. For each new component to be measured, the computer causes data to be displayed indicating the probe elements required at each probe position and the settings required for the turntables supporting the two probe arrays 18, 19. The angular transducers 22e, 23e, 24a, 25a provide position inputs to the computer 80 which must match the required positions for the workpiece to be meausred before measuring can commence. The computer also outputs appropriate control signals to a valve driver 88 which controls solenoid valves which in turn control air supply to the units 69. Each linear transducer is electrically connected to its own circuit which energises the transducer and converts its output signal to an analog voltlage linearly dependent on displacement in known manner. These analog voltages are supplied to an analog to digital converter 83 via a selector 84 under the control of computer 80. The computer receives the measurement data from the transducers and the slide position data from the slide position encoders and processes this data to establish the dimensions of the workpiece and, if necessary, pass corrective data to the computer 81. The individual data received from the transducers at each position is compared with the data previously obtained when the same sequence of measurements was carried out on a master component.

By way of example, when inspecting a turbine blade with a fir tree section root at one and a shroud position at the other end, the workpiece is mounted so that the inner and outer planar end surfaces of the blade are vertical, and the turntables are set so that the tips of the tree probes of each probe array are in a line parallel to the lengths of the grooves in the fir tree section root. Measurement on the end surfaces of the fir tree section root are made using the one array of probes, say array 19. the measurements being made by transverse displacement of the tips to displace the second transducer of each probe element. Measurements of the grooves are made using both arrays with the tips resting in the grooves. Outputs from both transducers associated with each probe element are used. The single probe 20 is used to make all the measurements required at the shroud end. Slide movements can be carried out rapidly and a large number of points on the componenet can be measured in a relatively short time as compared with a conventional single point measuring machine. Setting time between component runs is much less than that required for a conventional multi-point measurement machine.

In order to avoid damage to the probes by collision as a result of program errors or the like, it will be seen from FIG. 7, that each transducer output voltage is applied to a voltage comparator, $C_1, C_2, C_3, C_4 \ldots C_n$ to compare this output voltage with a reference level representing the normal maximum output voltage for the normal measuring range of the transducer (this measuring range being greater than the size of the steps of the slide positioning system). If any comparator is activated by overtravel of the associated probe element, an input signal is provided to an INTERRUPT input terminal of the computer 80. This signal initiates an interrupt routine which immediately causes the computer 80 to pass a stop instruction to the slide position control to freeze all movements. Then the transducers are sequentially interrogated to ascertain which has caused the signal and the appropriate slide movement is reversed.

We claim:

1. A gauging device for use in a component inspecting machine, comprising a carrier, a linear analog transducer having a body mounted on said carrier and a relatively moveable part mounted on said body, an elongated probe element supported on said carrier, a first coupling part on one end of the probe element, a second coupling part on the movable part of the transducer, one of said first and second coupling parts being a spherical element and the other being a socket for contacting the spherical element, said first and second coupling parts being interengaged such that longitudinal displacement of the probe element by contact of a contact tip at its other end is transmitted to the movable part of the transducer, said transducer providing, in use, an electrical output signal related to the position of the movable part thereof, relative to the transducer body.

2. A gauging device as claimed in claim 1 further comprising coacting guiding means on the probe element and the carrier for preventing rotation of the probe about a longitudinal axis passing through the centre of said spherical element and also about a first transverse axis passing through the centre of said spherical element, but permitting rotation of the probe element about a second transverse axis passing through the centre of said spherical element, and a further linear analog transducer having a body mounted on the carrier and a relatively movable part mounted on the futher transducer body and engageable with the probe element adjacent said other end thereof.

3. A gauging device as claimed in claim 2 in which said guiding means comprises a pair of spheres attached to the probe element with their centres spaced apart in the direction of said first transverse axis, and a pair of planar guide surfaces on the carrier, said guide surfaces being parallel and spaced apart by a distance only slightly greater than the diameter of the spheres.

4. A gauging device as claimed in claim 3, in which said further transducer incorporates spring loading which urges the movable part thereof towards the probe element, said movable part having a flat end face engageable by an abutment on the probe element and the probe element being provided with a stop element which coacts with a guiding face on the carrier, said stop element being urged into contact with the guiding face by the spring loading of the transducer and said flat end face and said guiding face being parallel to the length of the probe element which the stop element is in contact with the guiding face.

5. A gauging device as claimed in claim 1 in which the socket is on the movable part of the transducer and the spherical element is on the probe element, further comprising a stop member on the carrier projecting into a slot in the probe and engageable by a part of said spherical element for limiting longitudinal displacement of the probe element.

6. A gauging device as claimed in claim 5 in which a stop element is provided on the probe element adjacent said other end thereof and a coacting guiding face is provided on the carrier, spring-loaded means being provided to urge the probe element laterally such that said stop element contacts said guiding face, the arrangement being such that for removing the probe element the latter can be displaced longitudinally to cause the stop element to reach a position beyond an end of the guiding face.

7. A gauging device as claimed in claim 1 in which said probe element is free to be angularly displaced relative to the movable part of the transducer in any direction about the centre of the spherical element, and in which there is provided a plurality of further linear analog transducers each having a body mounted on the carrier and a relatively movable part arranged to be displaced by the probe element on lateral displacement of the contact tip of the probe element.

8. A gauging device as claimed in claim 7 in which there are four of said further transducers mounted on said carrier in a cruciform arrangement, the movable part of each of said further transducers contacting a part-spherical surface on the probe element adjacent the other end thereof.

9. A gauging device as claimed in claim 8 in which said movable part of each of the further transducers is provided with a flat contact face for contacting said part spherical surface.

10. A gauging device as claimed in claim 9 further comprising four selectively operable holding devices mounted on the carrier and coacting with respective ones of the further transducer, each holding device acting, on operation thereof, to hold the movable part of the associated one of the further transducers in a predetermined position, so that the flat face of the movable elements acts as a stop against which the part-spherical surface is urged by spring-loading incorporated in an oppositely disposed one of the transducers.

11. A gauging device as claimed in claim 10 in which each holding means incorporates yielding means permitting the movable members of held ones of the further transducers to yield in the event of unexpected displacement of the probe element on contact thereof with a component under inspection.

12. A component inspection apparatus comprising:
a component mounting means for receiving and mounting a component to be inspected;
means for supporting a gauging means;
gauging means comprising a plurality of gauging devices, each gauging device including:
an elongate probe element, each elongate probe element provided at one end with a contact tip and at another end with a first coupling, said probe element longitudinally displaceable from a rest position relative to said supporting means by engagement of said contact tip with said component received in said component mounting means; and
a transducer having a body mounted relative to said supporting means and a relatively movable part provided with a second coupling, said second coupling engaged with said first coupling, one of said first and second couplings being a spherical element and the other of said first and second couplings being a socket, and said transducer comprising a means for providing an output signal representing the magnitude of any displacement from said rest position of said probe element;
positioning means for effecting relative displacement between said component mounting means and said support means in a plurality of different directions;
sequence control means for controlling the positioning means and causing said component mounting means and said support means to be positioned relative to one another in a series of predetermined positions such that said probe elements of said gauging devices make contact with a series of points on a surface of said component where in each of said predetermined positions said probe elements are displaced by engagement of said contact tips with said component; and means for receiving an output signal from each of said plurality of gauging devices for each of said predetermined positions of said component mounting means relative to said support means.

13. The apparatus according to claim 12, wherein said gauging means includes means for adjusting the position of said gauging devices relative to said support means.

14. The apparatus according to claim 13, wherein said adjusting means includes means for angularly adjusting position of said probe elements of said gauging devices relative to said support means.

15. The apparatus according to claim 12, wherein said gauging means includes means for adjusting the position of said probe element of at least one gauging device relative to said probe elements of said other gauging devices.

16. The apparatus according to claim 12, wherein said probe element is angularly displaced about an axis defined by said engagement of said first and second couplings, and wherein each said gauging device further includes a further transducer, operatively coupled to said respective probe element, for producing a further output signal representing a magnitude of lateral displacement of said contact tip of said probe element.

17. The apparatus according to claim 16, further including means for constraining angular displacement of said contact tip of said respective probe element.

18. The apparatus according to claim 12, further including comparator means, responsive to said output signals from said transducers, for producing an indication signal when said output signal of any of said transducers exceeds a predetermined level; and said sequence control means including means, responsive to said indication signal, for stopping operation of said positioning means.

* * * * *